United States Patent
Li et al.

(10) Patent No.: US 9,379,800 B2
(45) Date of Patent: Jun. 28, 2016

(54) METHOD AND APPARATUS FOR CHANNEL STATE INFORMATION FEEDBACK

(75) Inventors: Dong Li, Shanghai (CN); Keying Wu, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 793 days.

(21) Appl. No.: 13/380,338

(22) PCT Filed: Jun. 23, 2009

(86) PCT No.: PCT/CN2009/000698
§ 371 (c)(1),
(2), (4) Date: Dec. 22, 2011

(87) PCT Pub. No.: WO2010/148535
PCT Pub. Date: Dec. 29, 2010

(65) Prior Publication Data
US 2012/0099470 A1 Apr. 26, 2012

(51) Int. Cl.
*H04B 7/06* (2006.01)
*H04B 7/02* (2006.01)
*H04L 5/00* (2006.01)

(52) U.S. Cl.
CPC .............. *H04B 7/0626* (2013.01); *H04B 7/024* (2013.01); *H04L 5/0035* (2013.01)

(58) Field of Classification Search
None
See application file for complete search history.

(56) References Cited

U.S. PATENT DOCUMENTS

| 8,229,017 B1 * | 7/2012 | Lee et al. | 375/267 |
| 2005/0265436 A1 | 12/2005 | Suh et al. | |
| 2011/0211547 A1 * | 9/2011 | Kim et al. | 370/329 |
| 2011/0211628 A1 * | 9/2011 | Hammarwall et al. | 375/224 |
| 2011/0235607 A1 * | 9/2011 | Haustein et al. | 370/329 |
| 2011/0319092 A1 * | 12/2011 | Kim et al. | 455/452.1 |

FOREIGN PATENT DOCUMENTS

| CN | 1684457 A | 10/2005 |
| CN | 101159462 A | 4/2008 |

(Continued)

OTHER PUBLICATIONS

International Search Report for PCT/CN2009/000698 dated Apr. 1, 2010.
Papadogiannis et al., "A Framework for Decentralising Multi-Cell Cooperative Processing on the Downlink," Globecom Workshops 2008 IEEE, pp. 1-5.

(Continued)

*Primary Examiner* — Mohammad Adhami
(74) *Attorney, Agent, or Firm* — Fay Sharpe, LLP (57) ABSTRACT

Embodiments of the present invention provide a method and apparatus for channel state information feedback. The method comprises: estimating channel state information from the mobile terminal to a serving cell and neighboring cells according to channel state information reference signals (CSI-Reference Signal) received from a plurality of coordinating cells; calculating a precoding matrix based on the estimated channel state information of the serving cell; calculating precoded channel state information respectively for the serving cell of the mobile terminal and neighboring cells in the coordinating cells according to the obtained precoding matrix; and feeding the precoded channel state information back to the serving cell of the mobile terminal. The above technical scheme can implement flexible and efficient channel status information feedback with low overhead, and enable multi-cell coordinated transmission to perform flexible and efficient precoding processing based on the feedback.

14 Claims, 4 Drawing Sheets

(56) References Cited

FOREIGN PATENT DOCUMENTS

| | | |
|---|---|---|
| CN | 101257367 A | 9/2008 |
| CN | 101282564 A | 10/2008 |
| CN | 101378277 A | 3/2009 |
| EP | 1 901 444 A1 | 3/2008 |
| JP | 2008-533924 A | 8/2008 |
| JP | 2009-112001 A | 5/2009 |
| JP | 2011-004161 A | 1/2011 |
| JP | 2012-520001 A | 8/2012 |
| JP | 2012-525022 A | 10/2012 |

OTHER PUBLICATIONS

Office Action of corresponding Chinese Application No. 200980158706.8, dated Jun. 28, 2013, pp. 1-8.

Supplementary European Search Report for corresponding European Application No. 09846335, dated May 9, 2014, 8 pages.

"CoMP Feedback Discussion," CoMP Feedback ad-hoc, 3GPP RAN WG1 #57, May 4-8, 2009, San Francisco, CA, 6 pages, R1-092272.

Lee et al., "Multipl User MIMO with Only Precoded Pilot and Limited Feedback for FDD DL," IEEE vol. 802.16m, May 5, 2008, pp. 1-22.

* cited by examiner

METHOD AND APPARATUS FOR CHANNEL STATE INFORMATION FEEDBACK

FIELD OF THE INVENTION

The present invention relates to wireless communication technologies, and particularly to a method and apparatus for channel state information feedback.

BACKGROUND OF THE INVENTION

The existing solutions for channel feedback to enable multi-cell coordinated transmission includes: 1) Channel State Information (CSI) matrix feedback; 2) Precoding Matrix Index (PMI) feedback; and 3) uplink (UL) sounding feedback.

The above types of feedback have the following drawbacks:

(1) CSI matrix feedback leads to a large signaling overhead, although it can provide a base station (BS) with full channel information;

(2) PMI feedback is an efficient feedback mechanism in single BS transmission mode, however, in multi-cell transmission, PMI feedback may largely limit the freedom of precoding operation of involved multiple cells;

(3) UL sounding feedback is an efficient feedback approach in time division duplex (TDD) mode, but it is difficult to be applied in frequency division duplex (FDD) mode because symmetry of uplink and downlink channels is utilized. Additionally, the asymmetric interference distribution among the downlink (DL) and UL will damage the accuracy of channel information estimation.

Therefore, there is a need for an efficient method for channel state information feedback which can solve the above problems.

SUMMARY OF THE INVENTION

In order to solve the above problems, embodiments of the present invention provide a method and apparatus for channel state information feedback.

According to one aspect of an embodiment of the present invention, there is provided a method for channel state information feedback, comprising: estimating channel state information from the mobile terminal to a serving cell and neighboring cells according to channel state information reference signals (CSI-Reference Signals) received from a plurality of coordinating cells; calculating a precoding matrix based on the estimated channel state information of the serving cell; calculating precoded channel state information respectively for the serving cell of the mobile terminal and neighboring cells in the coordinating cells according to the obtained precoding matrix; and feeding the precoded channel state information back to the serving cell of the mobile terminal.

According to another aspect of an embodiment of the present invention, there is provided a method for applying precoded channel state information, comprising: at least one cell in coordinated communication using the precoded channel state information related thereto to perform coordinated precoding operation for at least one mobile terminal, wherein the precoded channel state information corresponding to any one of at least one mobile terminal is obtained by calculating according to the precoding matrix of the serving cell of the any one mobile terminal; and the at least one cell sending a signal that coordinated precoding operation is performed.

According to another aspect of an embodiment of the present invention, there is provided a mobile terminal, comprising: a channel estimating unit configured to estimate channel state information from the mobile terminal to a serving cell and neighboring cells according to channel state information reference signals (CSI-Reference Signals) received from a plurality of coordinating cells; a matrix calculating unit configured to calculate a precoding matrix based on the channel state information of the serving cell estimated by the channel estimating unit; a precoding unit configured to calculate precoded channel state information respectively for the serving cell of the mobile terminal and neighboring cells in the coordinating cells according to the precoding matrix obtained by the matrix calculating unit; a feeding back unit configured to feed back the precoded channel state information obtained by calculation of the precoding unit to the serving cell of the mobile terminal.

According to another aspect of an embodiment of the present invention, there is provided abase station, comprising: a coordinating matrix calculating unit configured to use the received precoded channel state information related thereto to perform coordinated precoding operation for at least one mobile terminal, wherein the precoded channel state information corresponding to any one of at least one mobile terminal is obtained by calculating according to the precoding matrix of the serving cell of the any one mobile terminal; a coordinated transmission unit configured to send a signal that the coordinated precoding operation is performed at the coordinating matrix calculating unit.

According to a further aspect of an embodiment of the present invention, there is provided a communication system, comprising the above base station and mobile station.

Based on the above technical solution, embodiments of the present invention have the following advantages:

1. Compared with sounding based feedback, the feedback solution proposed in the embodiments of the present invention can not only be applied in TDD, but also FDD systems, irrelevant to the symmetry of the uplink and downlink channels.

2. Compared with traditional PMI feedback, the feedback solution proposed in the embodiments of the present invention can provide the eNB with a large flexibility in selecting and applying a particular DL CoMP precoding algorithm.

3. Compared with the explicit full channel feedback, the feedback solution proposed in the embodiments of the present invention can greatly reduce the feedback overhead, especially when the antenna number at eNB and UE are large.

BRIEF DESCRIPTION OF THE ACCOMPANYING DRAWINGS

Advantages of the present invention will be made more apparent according to the following description with reference to figures, wherein.

DETAILED DESCRIPTION OF PREFERRED EMBODIMENTS

Preferred embodiments of the present invention will be described in detail with reference to the figures, and details and functions unnecessary for the present invention are omitted in the course of description to prevent confusion for the understanding of the present invention.

Figure 1:
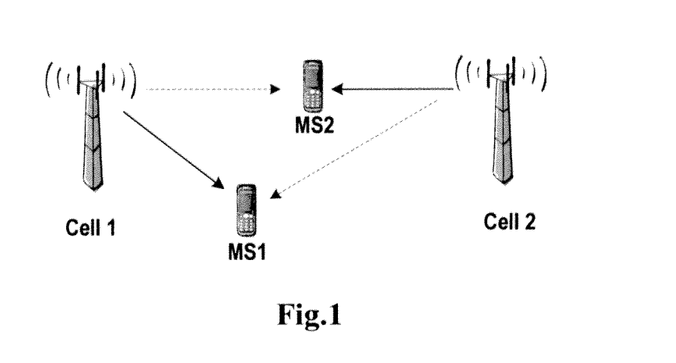
FIG. 1 illustrates a schematic view of a system for feeding back channel state information according to an embodiment of the present invention.

In an embodiment of the present invention, there is provided a communication system comprising the following mobile terminal and base station as shown in FIG. 1.

Figure 2:
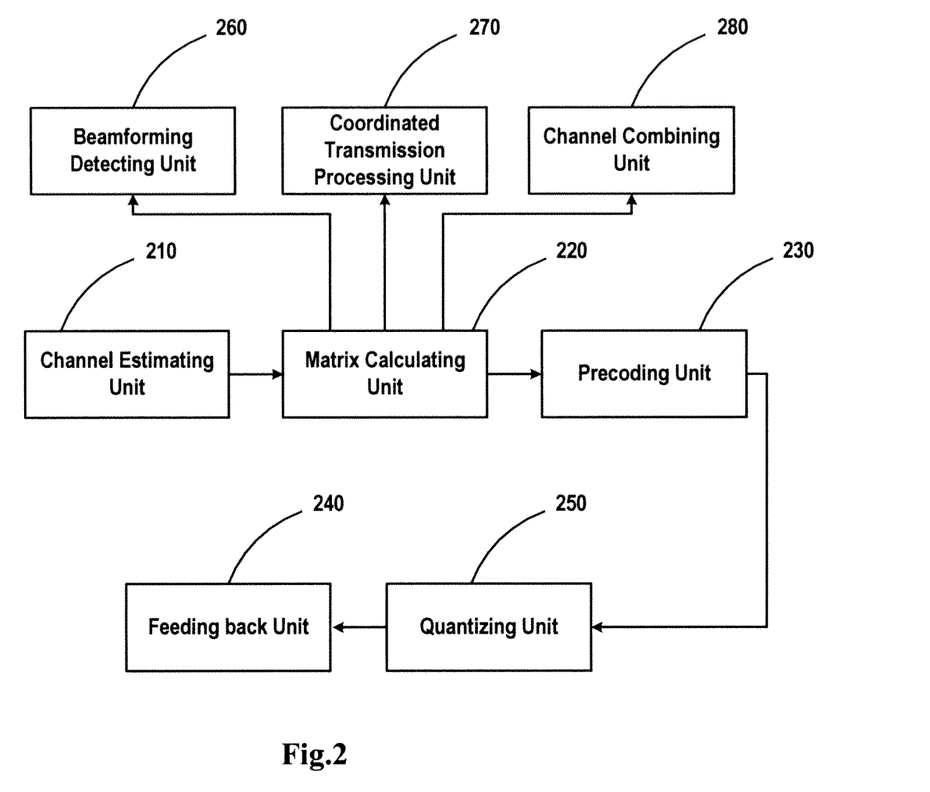
FIG. 2 illustrates a block diagram of a mobile terminal for feeding back channel state information according to an embodiment of the present invention.

In an embodiment of the present invention, there is provided a mobile terminal. As shown in FIG. 2, the mobile terminal comprises: a channel estimating unit 210 configured to estimate channel state information from the mobile terminal to a serving cell and neighboring cells according to CSI-Reference Signals received from a plurality of coordinating cells; a matrix calculating unit 220 configured to calculate a precoding matrix based on the channel state information of the serving cell estimated by the channel estimating unit 210; a precoding unit 230 configured to calculate precoded channel state information respectively for the serving cell of the mobile terminal and neighboring cells in the coordinating cells according to the precoding matrix obtained by the matrix calculating unit 220; a feeding back unit 240 configured to feed back the precoded channel state information obtained by calculation of the precoding unit 230 to the serving cell of the mobile terminal.

The mobile terminal further comprises a quantifying unit 250 configured to quantize the precoded channel state information obtained by calculation of the precoding unit 230, the feeding back unit 240 being further configured to feed back the precoded channel state information quantized by the quantifying unit 250 to the serving cell of the mobile terminal.

The mobile terminal further comprises a beamforming detecting unit 260 configured to use the precoding matrix generated by the matrix calculating unit 220 to perform linear detection of the received beamforming signal.

The mobile terminal further comprises a coordinated transmission processing unit 270 configured to use the precoding matrix generated by the matrix calculating unit 220 to merge joint transmission sent by the plurality of coordinating cells.

The mobile terminal further comprises a channel combining unit 280 configured to use a plurality of channels involved in coordinated transmission to form a composite channel; the matrix calculating unit 220 is further configured to calculate the precoding matrix based on the channel state information of the composite channel generated by the channel combining unit 280.

Figure 3:
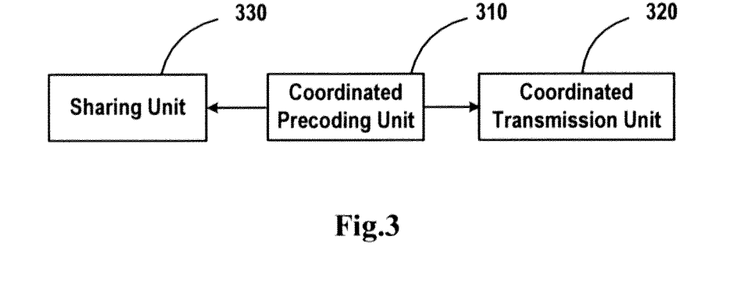
FIG. 3 illustrates a block diagram of a base station for feeding back channel state information according to an embodiment of the present invention.

In an embodiment of the present invention, there is provided a base station. As shown in FIG. 3, the base station comprises a coordinating matrix calculating unit 310 configured to use the received precoded channel state information related thereto to perform coordinated precoding operation for at least one mobile terminal, wherein the precoded channel state information corresponding to any one of at least one mobile terminal is obtained by calculating according to the precoding matrix of the serving cell of the any one mobile terminal; a coordinated transmission unit 320 configured to send a signal that the coordinated precoding operation is performed at the coordinating matrix calculating unit 310.

The base station further comprises a sharing unit 330 configured to share the precoded channel state information used by the coordinating matrix calculating unit 310 with other base stations carrying out the coordinated communication.

Although the base station and mobile terminal (UE) of the embodiments of the present invention are described in the form of separate function modules, each component shown in FIG. 2 and FIG. 3 can be implemented by using a plurality of elements in practical application, and the plurality of components as illustrated can be integrated in one chip or one apparatus in practical application. The base station and UE can also comprise any units or devices for other purposes.

Then, specific structures and operation procedures of the above base station and mobile terminal (e.g., UE) are described in detail with reference to FIG. 4. In an embodiment of the present invention, the precoded-CSI feedback can be used by the coordinating cells to derive the precoding weighting matrixes in DL CoMP (Coordinated Multi-Point) of coordinated-beamforming and joint transmission. In the description hereunder, m, n=1, 2, . . . , N, wherein N is the number of cells in coordinated communication, j, k=1, . . . , M, wherein M is the number of mobile terminal in coordinated communication.

Figure 4:
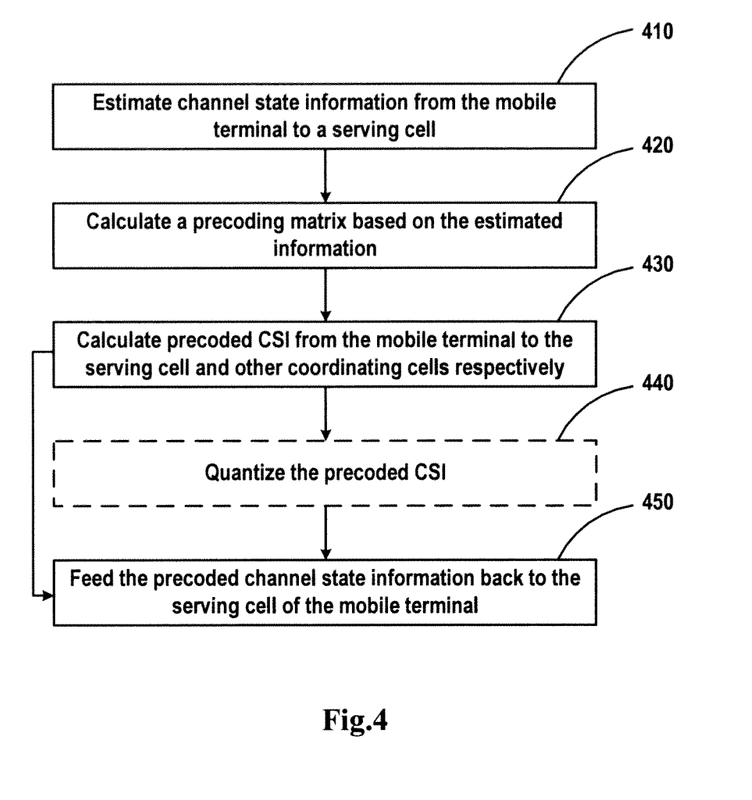
FIG. 4 illustrates a flowchart of a method for feeding back channel state information according to an embodiment of the present invention.

In FIG. 4, assuming cell-i (i=1, 2, . . . , N) constitutes the coordinating cell set for the target user UE-j, wherein cell-m acts as the serving cell for the user j, and other cells in the coordinating cell set are used for DL CoMP transmission for UE-j through coordinated-scheduling/beamforming or joint transmission.

Let $H_{mj}$ denote the channel state information from cell-m to UE-j, averaged over some subbands which may be preferred by the UE or instructed by eNB. In the precoded-CSI feedback, UE-j shall perform the following procedures.

Figure 5A:
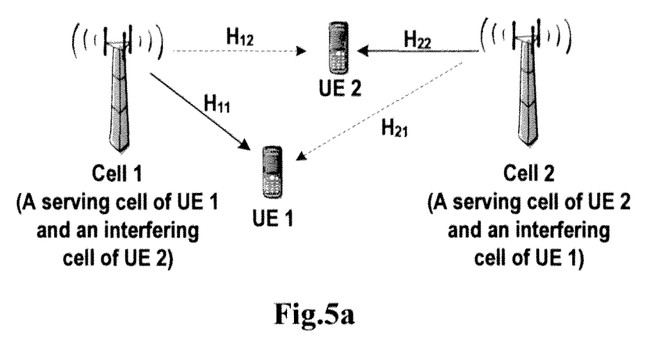
FIGS. 5*a*-5*c* illustrate a schematic view of a method for feeding back channel state information according to an embodiment of the present invention.

In step 410, the channel estimating unit 210 of the UE-j shall estimate the $H_{ij}$ based on the received CSI-RSs (channel state information reference signals) from all the coordinating cells, wherein $H_{ij}$ denote the channel state information from cell-i to UE j. FIG. 5a illustrates a case in which there are two cells and two mobile terminals. In FIG. 5a, UE 1 obtains the channel state information H 11 and H 21 respectively with respect to the cell 1 and cell 2, UE 2 obtains the channel state information H 12 and H 22 respectively with respect to the cell 1 and cell 2, wherein cell 1 is the serving cell of UE 1 and an interfering cell of UE 2; the cell 2 is the serving cell of UE 2 and an interfering cell of UE 1.

In step 420, the matrix calculating unit 220 of UE j calculates the precoding matrix $W_{UE-j}$. An example of the precoding matrix is the principle left singular vector of $H_{mj}$, that is, $$W_{UE-j}=(U(:,1))^H \quad (1)$$

Wherein U is a left singular matrix of channel estimation of the serving cell of the UE j, U (:,1) denotes the first column of the U matrix, $H_{mj}=USV^H$ is the SVD (singular value decomposition) decomposition between UE-j and its serving cell, i.e., cell-m. Here it is assumed that the singular values are arranged in a descending order.

In step 430, the precoding unit 230 of the UE-j calculates the precoded-CSI for the serving cell and neighboring cells in coordinating cells as follows $$pcH_{ij}=W_{UE-j}H_{ij}, i=1,2,\ldots,N \quad (2)$$

Wherein $pcH_{ij}$ is the precoded CSI for cell-i, and N is the number of the cells in the coordinated communication.

Figure 5B:
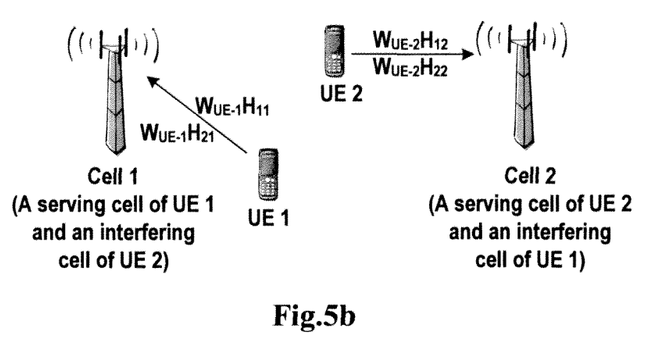

In step 450, the feeding back unit 240 of the UE-j feedbacks the obtained precoded-CSI to its serving cell (cell m). Take a situation with two cells and two mobile terminals as an example, as shown in FIG. 5b, the UE 1 sends the precoded CSI ($W_{UE-1}H_{11}$, and $W_{UE-1}H_{21}$) to its serving cell (cell 1); the UE 2 sends the precoded CSI ($W_{UE-2}H_{12}$ and $W_{UE-2}H_{22}$) to its serving cell (cell 2).

The method further can comprise step 440 in which the quantifying unit 250 of the UE j performs a quantifying processing to the precoded CSI before the feeding back unit 240 feeds back the obtained precoded CSI.

Figure 5C:
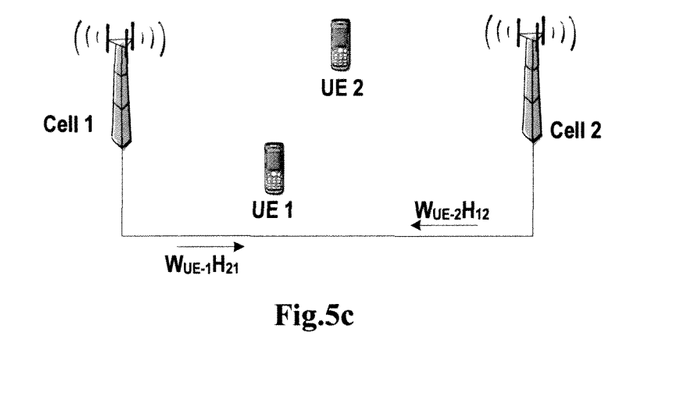

After the cell m receives the precoded CSI, the precoded CSI can be shared with the coordinating cells via the sharing unit 330. Take a situation with two cells and two mobile terminals as an example, as shown in FIG. 5c, the sharing unit 330 of the cell 1 sends the precoded CSI ($W_{UE-1}H_{21}$) related to the cell 2 to the cell 2 via a communication network such as a backhaul network. Likewise, the cell 2 sends the precoded CSI ($W_{UE-2}H_{12}$) related to the cell 1 to the cell 1 via a communication network such as a backhaul network. Certainly, in the embodiments of the present invention, the cell 1 and the cell 2 can share all or partial CSI possessed by themselves.

From the above steps, we can see that the same single preceding matrix which depends on the channel between the user and the serving cell is applied to all the channels between the user and the serving cell and neighboring cells. The precoding matrix only needs to be calculated once for multiple channels, so a very small signaling overhead can be achieved by this solution.

In practice, the above preceded CSI feedback can be used for multiple applications, including but not limited to coordinated beamforming and joint transmission, which will be described in detail hereunder.

Embodiment 1

Coordinated-Beamforming

In coordinated-beamforming provided by the embodiments of the present invention, the data is only transmitted by the serving cell (cell-m) for the target user (UE-j), while the neighbouring cells (cell-i, i=1, 2, ..., N, i≠m) in the coordinating cell set, if data is scheduled for their own users on the same subband as that in cell-m for UE-j, the cell-i (i≠m) deliberately suppress the interference to UE-j by appropriate coordinated preceding operation based on the preceded-CSI feedback (which is fed back by the target user and shared by the serving cell to all the coordinating cells).

Without loss of generality, let's focus on one of the interfering neighbor cells, say cell-n and assume that cell-n serves its own user, say UE-k, on the same subband as the cell-m serves UE-j. Taking the ZF (zero forcing) linear precoding algorithm as an example, the coordinated preceding matrix can be derived by the coordinating matrix calculating unit 310 of the cell-n performing the coordinated preceding operation for UE-k with interference nulling to UE-j taken into account, as follows $$W_{Cell-n} = v_1 v_2 \quad (3)$$

wherein matrix $v_1$ constitutes the orthonormal vector that spans the null space of $pcH_{nj}$, while $v_2$ is the principle right singular vector of the combined matrix $pcH_{nj}v_1$.

Similarly, the preceding matrix employed at cell-m for the UE-j while interference nulling to UE-k, is derived as follows:

$$W_{Cell-m} = v_a v_b \quad (4)$$

wherein matrix $v_a$ constitutes the orthonormal vector that spans the null space of $pcH_{mk}$, while $v_b$ is the principle right singular vector of the combined matrix $pcH_{mk}v_a$.

Thereafter, the coordinated transmission unit 320 sends a signal that the coordinated precoding operation is performed.

At the receiver side of UE-j, the received signal can be expressed as (here, for simplicity only the interference from cell-n is considered, other interferences and noises are omitted)

$$Y_j = H_{mj} v_a v_b s_j + H_{nj} v_1 v_2 s_k \quad (5)$$

wherein the first term is useful signal and the second term is the interference from cell-n, $s_j$ is the signal sent by the cell-m to the UE j, and $s_k$ is the signal sent by the cell-n to the UE k. In the example, the beamforming detecting unit 260 of the UE j uses the weighting vector of $W_{UE-j}$ (the precoding matrix of the precoded CSI feedback of the UE j) to perform linear detection of the received signals:

$$W_{UE-j} Y_j = W_{UE-j} H_{mj} v_a v_b s_j + W_{UE-j} H_{nj} v_1 v_2 s_k \quad (6)$$
$$= pcH_{mj} v_a v_b s_j + pcH_{nj} v_1 v_2 s_k$$

Since $v_1$ is used to store the null space of $pcH_{nj}$, $pcH_{nj} v_1 v_2 s_k = 0$, and the following is obtained:

$$W_{UE-j} Y_j = pcH_{mj} v_a v_b s_j$$

Figure 6:
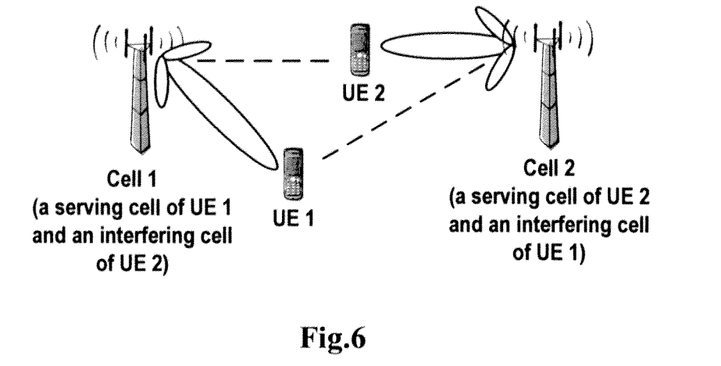
FIG. 6 illustrates a schematic view applying the method for channel state information feedback to beamforming according to an embodiment of the present invention.

FIG. 6 illustrates a schematic view of the transmission of the signal at the base station in this situation. It can be seen from FIG. 6 that the sidelobe (namely, interference to other UEs) of the signal sent by cell-1 and cell-2 respectively is suppressed very well and has an excellent orientation.

It should be appreciated that the ZF detector with weighting vector of $W_{UE-j}$ is only for illustration purpose, in practical system, other detectors, e.g., MMSE (Minimum Mean Square Error) detector may be applied.

Embodiment 2

Single-User Joint-Transmission

In joint transmission, based on the precoded-CSI feedback from the user, the same data is transmitted by the coordinating cells, cell-i, i=1, 2, ..., N, to the target user (UE-j) through respective precoding, to achieve the joint transmission for the UE j. According to the supported user number in the same resource, joint-transmission can be further divided into two subtypes, SU-JT (single-user joint-transmission) and MU-JT (multi-user joint transmission). In SU-JT, only single user is served jointly by the coordinating cells, while in MU-JT, multiple users can be served jointly by the coordinating cells through appropriate multi-user coordinated precoding operation.

Method 1: SU-JT precoding is performed at the coordinating matrix calculating unit 310 of the coordinating cells based on the above solution of channel state information feedback, that is, the user (UE-j) precodes all the relevant channels using the principle left singular vector of the serving cell ($H_{mj}$) and the precoding matrix at cell-i (i=1, 2, ..., N) can be expressed as $$W_{Cell-i} = \frac{pcH_{ij}}{\|pcH_{ij}\|} = \frac{W_{UE-j} H_{ij}}{\|W_{UE-j} H_{ij}\|} \quad (7)$$

It should be appreciated that since $W_{UE-j}$ can take the principle left singular vector of $H_{mj}$, the precoding at cell-m is purely local (i.e., only depends on the channel between cell-m and UE-j and doesn't depend on other channels), while the precoding at cell-i, i≠m is a compromise of local and global precoding in the sense that it uses the combined information of $H_{ij}$ and principle left singular vector of $H_{mj}$.

Then, the coordinated transmission unit 320 sends a signal that the coordinated precoding operation is performed. The coordinated transmission processing unit 270 of the UE j uses the precoding matrix generated by the matrix calculating unit 220 to merge the signals from the coordinating cells.

Method 2: the channel combining unit 280 of the UE j uses all the relevant channels to form a composite channel $[H_{1j} H_{2j} \ldots H_{Nj}]$, the matrix calculating unit 220 calculates the precoding matrix based on the channel state information of the composite channel generated by the channel combining unit 280, and the feeding back unit 240 feeds back the precoded channel state information of the composite channel. The coordinating matrix calculating unit 310 in the cell-i uses the principle left singular vector of the composite channel to perform coordinated precoding according to the fed back precoded channel state information (note: the feedback information is actually the principle right singular vector of cpH). Specifically, the SU-JT at the cell-i can employ the i-th portion (i.e., the i-th block of $N_T$ elements, $N_T$ is the transmit antenna number at each cell) of the singular vector to perform coordinated precoding. This method is a form of global precoding.

Thereafter, the coordinated transmission unit 320 sends a signal that the coordinated precoding operation is performed.

Method 3: the target UE feeds back the precoded-channels to its serving cell, each cell precodes with each channel's own principle left singular vector. Equivalently, the target UE feeds back the principle right singular vector of each channel to the serving cell. Then each cell will perform the SU-JT precoding using the corresponding principle right singular vector as precoding matrix. This is a form of local precoding.

Embodiment 3

Multi-User Joint-Transmission

In MU-JT, multiple users will be served by the coordinating cells through joint-transmission in the same time and frequency resource allocation. Based on the above precoded-CSI feedback solution, global or local MU precoding can be performed at each of the coordinating cells. The global and local MU precoding with the proposed feedback solution are called method 1 and method 2, respectively, in the following.

Without loss of generality, two users, UE-j and UE-k whose serving cells are cell-m and cell-n, respectively, are focused in the formulation of MU precoders in the present embodiment. UE-j feeds back the precoded channel state information $pcH_{ij}$, i=1, 2, ..., N, precoding with $W_{UE-j}$ equal to the principle left singular vector of $H_{mj}$, to its serving cell, cell-m, while UE-k feeds back the precoded channel state information $pcH_{ik}$, i=1, 2, ..., N, precoding with $W_{UE-k}$ equal to the principle left singular vector of $H_{nk}$, to its serving cell, cell-n. The cell-m and cell-n share $pcH_{ik}$ and $pcH_{ij}$.

Method 1: Global MU-Precoding Based on the Proposed Feedback

The ZF global MU-precoder for the UE j can be derived by the coordinating matrix calculating unit 310 of the coordinating cell from the composite precoded channel state information $cpH_j=[pcH_{1j}, pcH_{2j}, \ldots, pcH_{Nj}]$ and $cpH_k=[pcH_{1k}, pcH_{2k}, \ldots, pcH_{Nk}]$ as follows, $$W_{global, UE-j} = v_1 v_2 \tag{8}$$

wherein matrix $v_1$ constitutes the orthonormal vector that spans the null space of $cpH_k$, while $v_2$ is the principle right singular vector of the combined matrix $cpH_j v_1$.

Similarly, the ZF global MU-precoder for UE-k can be expressed as $$W_{global, UE-k} = v_a v_b \tag{9}$$

wherein matrix $v_a$ constitutes the orthonormal vector that spans the null space of $cpH_j$, while $v_b$ is the principle right singular vector of the combined matrix $cpH_k v_a$.

Then, the joint transmission unit 350 in each coordinating cell extracts the corresponding elements of the global precoding matrix as precoding coefficients at the cell to perform joint transmission with respect to the corresponding mobile terminal. For example, the cell-i extracts the i-th element from $W_{global, UE-k}$ as a precoding coefficient for the joint transmission performed for the UE-k, and extracts the i-th element from $W_{global, UE-j}$ as a precoding coefficient for the joint transmission performed for the UE j.

Thereafter, the coordinated transmission unit 320 sends a signal that the coordinated precoding operation is performed.

Method 2: Local MU-Precoding Based on the Proposed Feedback

In this method, unlike the global MU precoding which is based on the composite precoded channel, the local MU precoding will be performed by the coordinating matrix calculating unit 310 at each cell based on only the precoded feedback corresponding to this cell. For example, the local ZF MU-precoder for UE-j at cell-m can be expressed as follows $$W_{cell-m, UE-j} = v_1 v_2 \tag{10}$$

wherein matrix $v_1$ constitutes orthonormal vector that spans the null space of $pcH_{mk}$, while $v_2$ is the principle right singular vector of the combined matrix $pcH_{mj} v_1$.

Similarly, the ZF local MU-precoder for UE-k can be expressed as $$W_{cell-m, UE-k} = v_a v_b \tag{11}$$

wherein matrix $v_a$ constitutes orthonormal vector that spans the null space of $pcH_j$, while $v_b$ is the principle right singular vector of the combined matrix $cpH_k v_a$.

Method 3: Global MU-Precoding Based on the Global Singular Vector Feedback

In this method, the channel combining unit 280 of each of the involved user terminals uses all the relevant channels to form a composite channel $cpH=[H_{1j} H_{2j} \ldots H_{Kj}]$, and the feeding back unit 240 feeds back the precoded composite channel to its serving cell, and its serving cell precodes with the principle left singular vector of the composite channel.

Then, global MU-precoding can be performed based on all the feedbacks from the involved multiple users and each cell takes the corresponding elements of the global MU-precoder as its precoding coefficients. In this method, ZF global MU precoding is assumed.

In comparison with the prior art, the feedback solution as proposed by the above embodiments of the present invention has the following advantages:

Compared with sounding based feedback, the feedback solution proposed in the embodiments of the present invention can not only be applied in TDD, but also in FDD systems, irrelevant to the symmetry of the uplink and downlink channels.

Compared with traditional PMI feedback, the feedback solution proposed in the embodiments of the present invention can provide the eNB with a large flexibility in selecting and applying a particular DL CoMP precoding algorithm.

Compared with the explicit full channel feedback, the feedback solution proposed in the embodiments of the present invention can greatly reduce the feedback overhead, especially when the antenna number at eNB and UE are large.

The feedback solution proposed in the embodiments of the present invention can provide the eNB with a large flexibility in selecting and applying a particular DL CoMP precoding algorithm, while keeping the feedback overhead low through only feeding back the essential equivalent channel information. From the initial simulations, it can be observed that using the same precoded-CSI feedback solution, satisfactory performance can be achieved in various DL CoMP operation modes, like Co-BF (coordinated beamforming), SU-JT and MU-JT.

For Co-BF transmission, two CO-BF precoders, one with precoded CSI and the other with unprecoded CSI, are compared. The Co-BF precoder with precoded CSI outperforms the other one by about 1.4 dB. This performance gain comes from the fact that the null space dimension of the precoded CSI (i.e., 3 in the simulation assumptions) is larger than that of unprecoded CSI (2 in the simulation assumptions) such that the former can provide a better eigenmode for the single stream transmission statistically.

Those skilled in the art may readily appreciate that different steps of the above method may be performed by a programming computer. In this text, some embodiments are intended to cover program storage devices that may be machine or computer-readable (e.g., a digital data storage medium) and program instructions executable by programmed machine or computer, wherein these instructions perform some or all of the steps of the above method. The program storage devices, for example, may be a digital memory, a magnetic storage medium (such as magnetic diskette or magnetic tape), hardware, or optical readable digital data storage medium. The embodiments are also intended to cover a computer programmed to execute steps of the above method.

The above description and figures only illustrate principles of the present invention. Therefore, it should be appreciated that those skilled in the art can propose different structures. Although these different structures are not explicitly described or indicated herein, they reflect the principles of the present invention and are included in the spirit and scope of the present invention. Besides, all the examples mentioned herein are definitely mainly used for teaching purpose and assist readers in understanding the principles of the present invention and concepts conceived by the inventor and promoting progress of the field, and should be interpreted as not limiting these particularly-mentioned examples and conditions. Besides, statements of the principles, aspects and embodiments of the present invention and specific examples thereof as mentioned herein include their equivalents.

The above description is only for implementing the embodiments of the present invention. Those skilled in the art should appreciate that any modifications or partial substitution without departure from the scope of the present invention all fall within the scope defined by the appended claims of the present invention. Therefore, the scope of protection of the present invention shall be subjected to the protection scope of the appended claims.

What is claimed is:

1. A method for channel state information feedback, comprising:

via a channel estimating processor, estimating channel state information from the mobile terminal to a serving cell and neighboring cells according to channel state information reference signals (CSI-Reference Signal) received from a plurality of coordinating cells;

via a matrix calculating processor, calculating a precoding matrix based on the estimated channel state information of the serving cell as a function of a left singular matrix of channel estimation of the serving cell of a j-th mobile terminal;

via a precoding processor, calculating precoded channel state information respectively for the serving cell of the mobile terminal and neighboring cells in the coordinating cells according to the obtained precoding matrix;

via a feeding back processor, feeding the precoded channel state information back to the serving cell of the mobile terminal;

via a receiver, receiving a signal transmitted using the precoded channel state information fed back to the serving cell;

wherein calculating the precoding matrix comprises using the following formula:

$$W_{UE\text{-}j} = (U(:,1))^H \quad (1)$$

wherein $W_{UE\text{-}j}$ is the precoding matrix, U matrix is the left singular matrix of channel estimation of the serving cell of the j-th mobile terminal, $U(:,1)$ denotes the first column of the U matrix and corresponds to a maximum singular value.

2. The method according to claim 1, further comprising quantizing the precoded channel state information, and feeding the precoded channel state information back to the serving cell of the mobile terminal comprises:

feeding the quantized precoded channel state information back to the serving cell of the mobile terminal.

3. The method according to claim 1, wherein calculating precoded channel state information respectively for the serving cell of the mobile terminal and neighboring cells in the coordinating cells according to the obtained precoding matrix comprises using the following formula to calculate the precoded channel state information:

$$pcH_{ij} = W_{UE\text{-}j} H_{ij}, i=1,2,\ldots,N$$

wherein $pcH_{ij}$ is the precoded CSI of the j-th mobile terminal for cell i, and $H_{ij}$ denotes the channel state information from the j-th mobile terminal to the i-th cell.

4. The method according to claim 1, further comprising:

using a plurality of relevant channels to form a composite channel;

and calculating the precoding matrix based on the estimated channel state information of the serving cell comprises:

calculating the precoding matrix based on the channel state information of the composite channel.

5. A method for applying precoded channel state information, comprising:

at least one cell in coordinated communication receiving precoded channel station information from at least one mobile terminal, wherein the precoded channel state information corresponding to any one of at least one mobile terminal is obtained by calculating according to the precoding matrix of the serving cell of the any one mobile terminal;

the at least one cell performing a coordinated precoding operation using the received precoded channel station information related thereto; wherein when performing coordinated beamforming, performing the coordinated precoding operation as a function of a principle right singular vector of a combined matrix; and when performing single-user joint transmission, performing the coordinated precoding operation using the following formula:

$$W_{Cell-i} = \frac{pcH_{ij}}{\|pcH_{ij}\|} = \frac{W_{UE-j}H_{ij}}{\|W_{UE-j}H_{ij}\|}$$

wherein $W_{cell-l}$ is the coordinated precoding matrix used by the i-th cell, $W_{UE-j}$ is the precoding matrix of the serving cell of the j-th mobile terminal, $pcH_{ij}$ is the precoded channel state information of the j-th mobile terminal for the i-th cell, $H_{ij}$ is the channel state information of the j-th mobile terminal for the i-th cell, wherein i=1, 2, ..., N, wherein N is the number of cells in coordinated communication, j=1, ..., M, wherein M is the number of mobile terminals in coordinated communication; and the at least one cell sending a signal according to the performed coordinated preceding operation.

6. The method according to claim 5, further comprising:
the at least one cell sharing the precoded channel state information received from the at least one mobile terminal with other cells in coordinated communication.

7. The method according to claim 6, wherein upon coordinated beamforming, at least one cell in coordinated communication using the precoded channel state information related thereto to perform coordinated precoding operation for at least one mobile terminal comprises:

at the n-th cell, precoding operation is performed for the k-th mobile terminal by using the following formula:

$$W_{Cell-n} = v_1 v_2$$

wherein, assuming the n-th cell is the serving cell of the k-th mobile terminal, matrix v1 constitutes orthonormal vector that spans the null space of $pcH_{nj}$, while $v_2$ is the principle right singular vector of the combined matrix $pcH_{nj}v_1$, and $pcH_{nj}$ is precoded channel state information of the j-th mobile terminal for the n-th cell, at the m-th cell, precoding operation is performed for the j-th mobile terminal by using the following formula:

$$W_{Cell-m} = v_a v_b$$

wherein, assuming the m-th cell is the serving cell of the j-th mobile terminal, matrix $v_a$ constitutes the orthonormal vector that spans the null space of $pcH_{mk}$, while $v_b$ is the principle right singular vector of the combined matrix $pcH_{mk}v_a$, and $pcH_{mk}$ is precoded channel state information of the k-th mobile terminal for the m-th cell, whereby the j-th mobile terminal uses the following formula to perform linear detection:

$$W_{UE-j}Y_j = W_{UE-j}H_{mj}v_a v_b s_j + W_{UE-j}H_{nj}v_1 v_2 s_k$$
$$= pcH_{mj}v_a v_b s_j + pcH_{nj}v_1 v_2 s_k$$

wherein, $W_{UEj}$ is the precoding matrix of the serving cell of the j-th mobile terminal, $Y_j$ is a signal received by the j-th mobile terminal, and $Y_j = H_{mj}v_a v_b s_j + H_{nj}v_1 v_2 s_k$, wherein $pcH_{mj}$ is the precoded channel state information of the j-th mobile terminal for the m-th cell, $s_j$ is a signal sent by the m-th cell to the j-th mobile terminal, $s_k$ is a signal sent by the n-th cell to the k-th mobile terminal, wherein, m, n=1, 2, ..., N, wherein N is the number of cells in coordinated communication, j, k=1, ..., M, wherein M is the number of mobile terminals in coordinated communication.

8. The method according to claim 6, wherein upon multi-user joint transmission, at least one cell in coordinated communication using the precoded channel state information related thereto to perform coordinated precoding operation for at least one mobile terminal comprises:
for relevant multiple mobile terminals, each cell of the at least one cell using the precoded channel state information to produce a multi-user precoder to perform coordinated precoding operation.

9. A mobile terminal, comprising:
a channel estimating processor configured to estimate channel state information from the mobile terminal to a serving cell and neighboring cells according to channel state information reference signals (CSI-Reference Signals) received from a plurality of coordinating cells;
a matrix calculating processor configured to calculate a precoding matrix based on the channel state information of the serving cell estimated by the channel estimating unit as a function of a left singular matrix of channel estimation of the serving cell of a j-th mobile terminal;
a precoding processor configured to calculate precoded channel state information respectively for the serving cell of the mobile terminal and neighboring cells in the coordinating cells according to the precoding matrix obtained by the matrix calculating unit;
a feeding back processor configured to feed back the precoded channel state information obtained by calculation of the precoding unit to the serving cell of the mobile terminal;
a receiver configured to receive a signal transmitted using the precoded channel state information fed back to the serving cell;
wherein the matrix calculating processor is further configured to calculate the precoding matrix using the following formula:

$$W_{UE-j} = (U(:,1))^H \quad (1)$$

wherein $W_{UE-j}$ is the precoding matrix, U matrix is the left singular matrix of channel estimation of the serving cell of the j-th mobile terminal, $U(:,1)$ denotes the first column of the U matrix and corresponds to a maximum singular value.

10. The mobile terminal according to claim 9, further comprising:
a quantifying processor configured to quantize the precoded channel state information obtained by calculation of the precoding unit,
the feeding back processor being further configured to feed back the precoded channel state information quantized by the quantifying unit to the serving cell of the mobile terminal.

11. The mobile terminal according to claim 9, further comprising:
a beamforming detecting processor nit configured to use the precoding matrix generated by the matrix calculating unit to perform linear detection of the received beamforming signal; and
a coordinated transmission processing processor configured to use the precoding matrix generated by the matrix calculating unit to merge joint transmission sent by the plurality of coordinating cells.

12. The mobile terminal according to claim 9, further comprising:

a channel combining processor configured to use a plurality of channels involved in coordinated transmission to form a composite channel; and the matrix calculating processor further configured to calculate the precoding matrix based on the channel state information of the composite channel generated by the channel combining unit.

13. A base station, comprising:

a coordinating matrix calculating processor configured to receive precoded channel station information from at least one mobile terminal, wherein the precoded channel state information corresponding to any one of at least one mobile terminal is obtained by calculating according to the precoding matrix of the serving cell of the any one mobile terminal;

the coordinating matrix calculating processor further configured to perform a coordinated precoding operation using the received precoded channel state information wherein when performing coordinated beamforming, the coordinating matrix calculating unit performs the coordinated precoding operation as a function of a principle right singular vector of a combined matrix; and when performing single-user joint transmission, the coordinating matrix calculating unit performs the coordinated precoding operation using the following formula:

$$W_{Cell-i} = \frac{pcH_{ij}}{\|pcH_{ij}\|} = \frac{W_{UE-j}H_{ij}}{\|W_{UE-j}H_{ij}\|}$$

wherein $W_{cell-l}$ is the coordinated precoding matrix used by the i-th cell, $W_{UE-j}$ is the precoding matrix of the serving cell of the j-th mobile terminal, $pcH_{ij}$ is the precoded channel state information of the j-th mobile terminal for the i-th cell, $H_{ij}$ is the channel state information of the j-th mobile terminal for the i-th cell, wherein i=1, 2, . . . , N, wherein N is the number of cells in coordinated communication, j=1, . . . , M, wherein M is the number of mobile terminals in coordinated communication; and a coordinated transmission processor configured to send a signal according to the performed coordinated precoding operation.

14. The base station according to claim 13, further comprising:

a sharing processor configured to share the precoded channel state information used by the coordinating matrix calculating unit with other base stations carrying out the coordinated communication.

* * * * *